United States Patent [19]
Greshes

[11] Patent Number: 5,368,790
[45] Date of Patent: Nov. 29, 1994

[54] METHOD FOR MAKING LENSES

[76] Inventor: Martin Greshes, 70 Corey La., East Meadow, N.Y. 11554

[21] Appl. No.: 932,088

[22] Filed: Aug. 19, 1992

[51] Int. Cl.⁵ .............................................. B29D 11/00
[52] U.S. Cl. ..................... 264/2.4; 264/296; 264/322
[58] Field of Search ................ 264/2.4, 294, 296, 322

[56] References Cited

U.S. PATENT DOCUMENTS

| | | | |
|---|---|---|---|
| 2,166,215 | 7/1939 | Lloyd | 264/2.4 |
| 2,298,429 | 10/1942 | Smith | 264/2.4 |
| 2,304,217 | 12/1942 | Tillyer | 264/2.4 |
| 2,304,663 | 12/1942 | Smith et al. | 264/2.4 |
| 2,532,501 | 12/1950 | Johnson | 264/2.4 |
| 2,664,025 | 12/1953 | Herman | 264/2.4 |

Primary Examiner—Mathieu Vargot
Attorney, Agent, or Firm—Lackenbach Siegel Marzullo Aronson & Greenspan

[57] ABSTRACT

A method for forming a preform mass of thermoplastic material into a lens without the formation of air bubbles or the entrapment of air pockets in the finished lens includes softening the preform mass under a predetermined pressure and temperature and continuing to apply the predetermined pressure while increasing the temperature until the mass has been compressed between two molds into the shape of the lens.

11 Claims, 7 Drawing Sheets

MOLD OPEN

MOLD CLOSED

MOLD OPEN

MOLD CLOSED

METHOD FOR MAKING LENSES

BACKGROUND OF THE INVENTION

This invention relates to a method and apparatus for making lenses, and more particularly to a system embodying the cold, compression molding of a lens between a pair of mold/cavities using a monolithic mass of thermoplastic material. The system is particularly applicable for use in house by the optician, optometrist and/or ophthalmologist. The method and apparatus further do not require the use of skilled technicians, and reduces the cost of prescription lenses since they are created substantially defect free, eliminating the need for any middle men, such as a laboratory or lens factory. Moreover, the lens can be fabricated quickly in much less than hour, so that the patient or customer can be fitted with a pair of prescription glasses during the same visit for one's eye examination.

Heretofore in the industry, lenses are traditionally fabricated in a distant wholesale laboratory. A patient or customer has an eye examination, and orders new lenses, he must then return a week or so later to receive and be fitted with a new pair of glasses with the laboratory fabricated lens. This procedure is not only very time consuming, but also expensive. At times errors are made in the prescription. In such cases, yet another visit is required or the lenses must be returned to the laboratory for further corrective measures or an entirely new set of lenses fabricated, with resulting delays and expense.

Within about the last ten years there has been a trend toward development of the so called eyeglass "Super Stores" or "one hour" laboratories. These types of stores are very expensive to run and operate. They require a huge inventory of blanks, and employ highly trained technicians to operate complex lens grinding machines and other finishing apparatuses required to complete all types of prescription lens.

Furthermore, these "Super Stores", to be profitable, require a constant stream of customers as they promote "one hour" service, and generally have highly paid technicians just waiting for orders to keep their machines operating at full capacity.

As a result of this phenomenon, most opticians, optometrists and/or ophthalmologists are losing their customer base and have had their earnings seriously eroded.

More recently, however, there has been an attempt to introduce the "mini-lab" to the optician/optometrist, and/or ophthalmologist. This is a direct attempt to bring in house "one-hour" capability of making lenses directly to the source who fills the prescription lens.

One such organization in this field is Vision Sciences of Monrovia, Calif., who markets an in-office lens casting system employing a choice of resins, such as Master Cast 1.5 clear resin, Master Cast 1.50 with UV protection and Master Cast 1.56 High Index with UV protection. Such a system is capable of casting plastic lens whose styles include single vision, progressive bifocals, flat top 28 or 35 bifocals, Round Seg 28 bifocals, flat top 7×28 bifocals, flat top 7×28 trifocals; and whose base curves are 2,4, 6 or 8 with lens diameters of 72 mm, 75mm and 80 mm. This Formalens system is of modular design and embodies a generally large work station incorporating a number of mold storage modules, a resin dispenser, and casting and curing stations. With cure cycles varying from 3 to 16 hours, the customer or patient must usually return a second time to complete his order for new prescription lenses. Such an overnight timetable in reality reduces such "one hour" service to "one day" service at best.

In addition, a deionized, laminar air flow unit is necessary in order to provide a static-free, dust-free area in order to ensure fabrication of clear, sharp spectacle lenses. Such "Method of Choice" plastic lens production systems for office use as marketed by Vision Sciences are known as Model numbers 2001 and 2002 and range in cost from about $27,000 to $63,000, excluding the cost of optional equipment, such as ultrasonic cleaning units and extended range molds that include higher powers and a wider selection of adds.

Such mini-labs are not only very expensive to purchase, but their cost of operation is also costly. In fact, the casting process is laborious since about half of same is "science" and half is "art". As a result, the scrap rate or rate of rejection is very high. This is due to the fact that the optician,optometrist and/or ophthalmologist is not an expert manufacturer, and lacks sufficient skill and training despite the fact that all purchasers of such Formalens System must undergo a lengthy and expensive training program at Vision Sciences' home office in order to be able to properly operate the system. It is so complex it requires a 100 page operator's manual in order to learn how to operate the system. All of these disadvantages have over the last few years brought on a definite need for an improved and better system.

Another similar type lens casting system is marketed by Techna Vision of San Diego, Calif., but this company is no longer believed to be in business. It is believed that the casting systems developed by both Techna Vision and Vision Sciences involved considerable difficulty due to the complexities of the casting systems employed. The experiences have been negative and, in reality, failures.

Other prior art systems are shown and discussed in the body of the present patent application.

OBJECTS OF THE INVENTION

It is the primary object of the present invention to provide a novel method and apparatus for the manufacture of ophthalmic lenses.

It is yet another object of the present invention to provide a more simplified, and less expensive means of fabricating relatively expensive lenses, such as multifocal lenses in house in the shortest possible time so as to eliminate the need for a customer to return a second time to the optician, optometrist and/or ophthalmologist's office.

A still further object of the present invention is to provide a novel method and apparatus of cold flowing and/or compression molding a monolithic mass of thermoplastic material into a lens virtually within minutes, so that one can obtain a pair of prescription glasses in a single, relatively short visit to the optometrist, optician and/or ophalmologist.

SUMMARY OF THE INVENTION

In summary, the invention pertains to a method and apparatus for making thermoplastic lens by first placing a pair of lens molds in a press; then positioning a preform of thermoplastic lens material on one of the molds; thereafter closing the lens molds and pressing the molds toward each other and against said preform to a predetermined pressure value; and then heating the molds until the preform begins to soften and the predetermined pressure value drops off slightly. Subsequently, continuing to heat the pair of molds while maintaining the predetermined pressure value; and repeating the heating and continuing to apply pressure steps until the preform is transformed by compression into a lens shaped by the pair of molds. Lastly, the molds are suitably cooled, while the predetermined pressure value is substantially maintained until the lens is released from the molds.

BRIEF DESCRIPTION OF THE DRAWINGS

The foregoing and other objects, features and advantages of the present invention will become readily apparent to those skilled in the art from a reading of the detailed description hereafter, when considered in conjunction with the accompanying drawings, wherein.

DETAILED DESCRIPTION OF THE PREFERRED EMBODIMENTS

Figure 1:
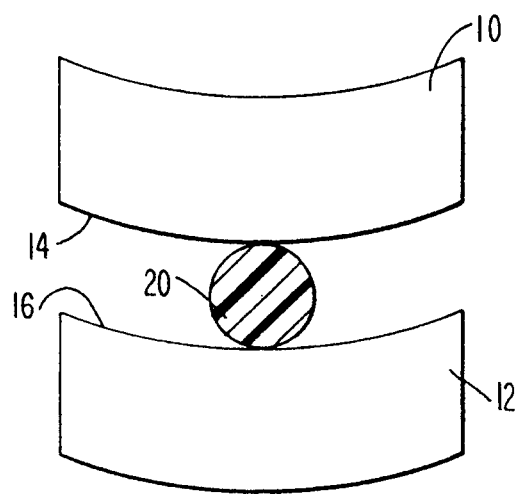
FIGS. 1-3 are vertical sectional views showing a typical pair of molds for use with my new and improved method and apparatus for forming finished multi-focal ophthalmic lenses from a preform of plastic lens material in the form of a slug or sphere of moldable plastic.
Figure 2:
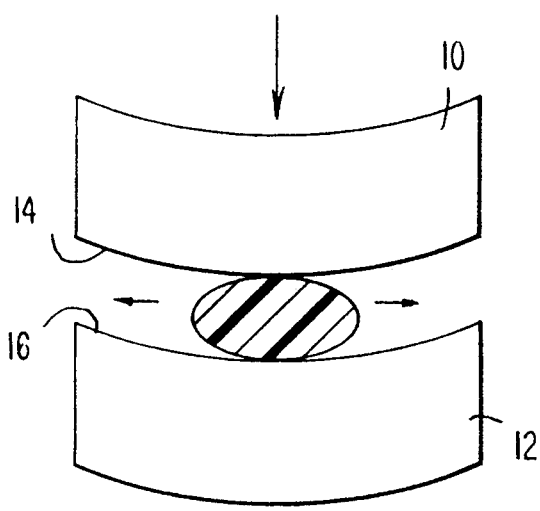
Figure 3:
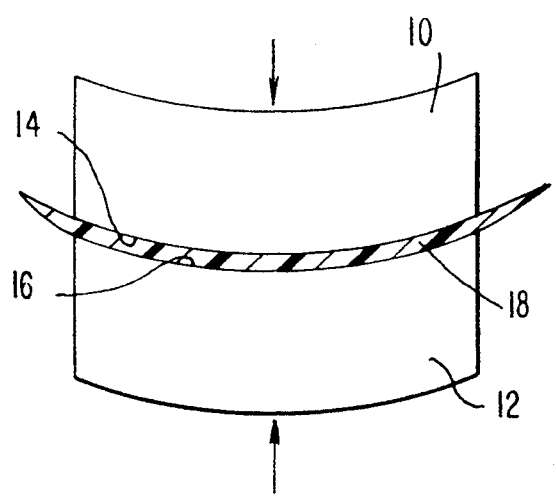
Figure 4:
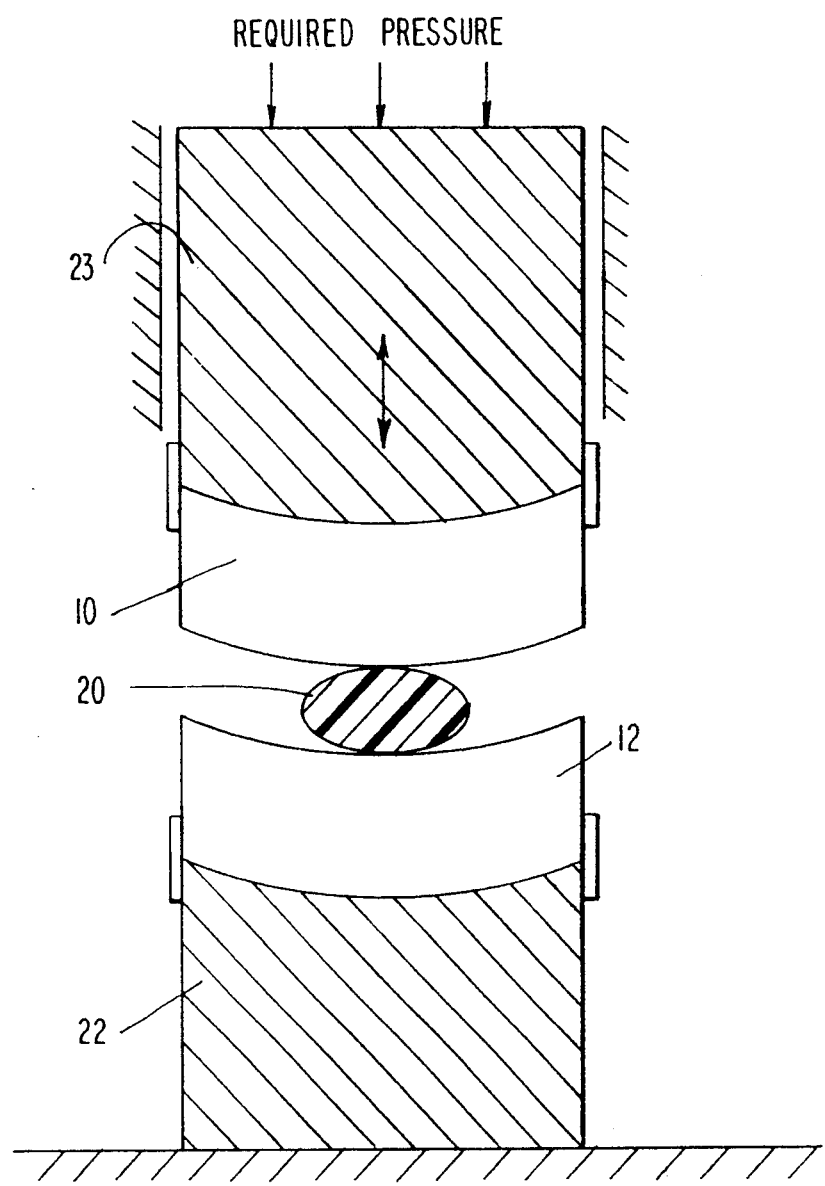
FIG. 4 is a vertical sectional view of my new and novel apparatus for forming the ophthalmic lens.
Figure 5:
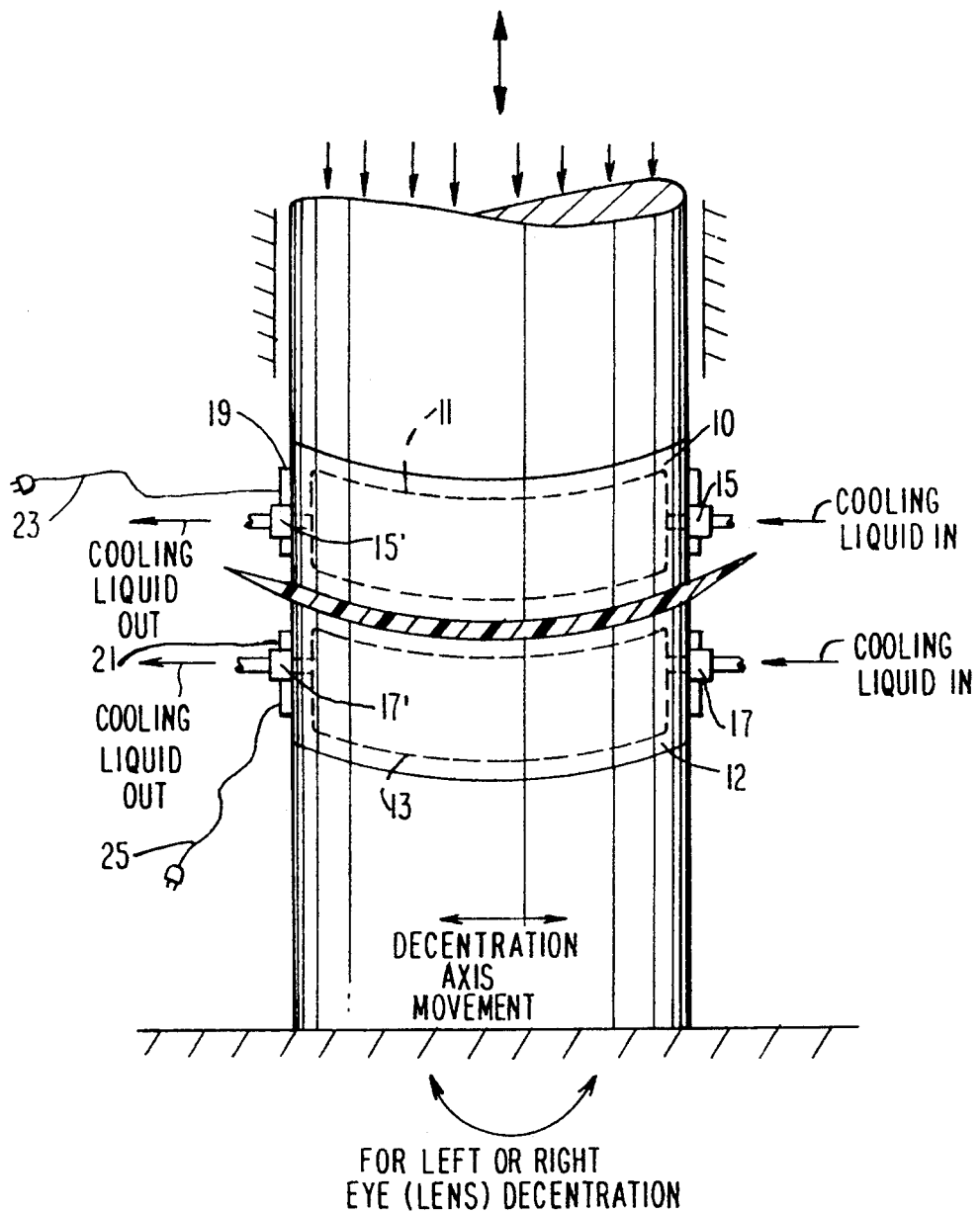
FIG. 5 is a more detailed elevational view of the molds shown in FIGS. 1-4.

Referring now to the drawings, and in particular to FIGS. 1-5, there is shown my novel method and apparatus for making prescription lens. As shown therein, a lens is made from a pair of predetermined molds (top 10 and bottom 12) having on their surfaces 14 and 16 the desired curves for the opposite sides of the finished lens 18. The lens 18 is preferably formed from a single, monolithic preform, pellet or slug (sphere) of plastic lens material 20, and preferably of a thermoplastic resin material, such as polymethyl/methacrylate, polycarbonates, polystyrenes, cellulose acetate, acrylic copolymers, thermoplastic polyesters, styrene acrylonitrile (SAN), and/or mixtures thereof. Suitable specific thermoplastic materials of such resins and their U.S. trademark names are for the polycarbonates, LEXAN and MAKROLON, respectively, made and sold by G.E. Plastics of Pittsfield, Mass. and Mobay Corp. of Pittsburgh, Penna.; for the acrylics, PLEXIGLASS and ACRYCAL, respectively, made and sold by Rohm & Haas of Philadelphia, Penna. and Continental Polymers of Compton, Calif.; and for the cellulose acetate, TENITE made and sold by Eastman Chemicals Inc. of Kingsport, Tenn. The edging of the lens 18 may be suitably finished by special edging equipment and the finished lens may then, if desired, be suitably treated with one or more coatings, such as a scratch resistant coating and/or suitably tinted or dyed to produce prescription sunglasses. With the method and apparatus of the invention, the lens can be fabricated from other suitable lens materials, so long as the material is a thermoplastic in contrast to that of a thermosetting material. As shown in FIGS. 4 and 5, the bottom mold 12 is suitably secured to and seated on the lower mold support 22, whereas the upper mold 14 is suitably secured and seated with respect to the ram or piston 23, and they perform the compression molding and pressing of the slug/sphere or preform 20 of plastic material into the desired shaped lens formed by the two mold halves. Mold halves may be changed manually or suitably automatically, and one may position the preform on the bottom mold 12 when a lens, such as 30 (see FIG. 8) is to be fabricated.

The molds 10 and 12 have hollow cavities 11 and 13 and are suitably cooled, preferably by water entering inlets 15 and 17 and exiting outlets 15' and 17' after a lens is formed by the molds. Other cooling means, such as by flowing fresh air over the molds may be employed if desired although such means requires more time to cool the molds and lens to room temperature. Cooling of the molds whether by water or air is important as the lens 18 may not be released safely and clearly from the molds 12 and 14 without such cooling operation. In addition, the molds 10 and 12 are further heated by means of electric heating bands 19 and 21 wrapped about the molds 10 and 12 and are suitably connected electrically by means of power cords or lines 23 and 25 to a suitable power source which is controlled by a computer program for operating the apparatus.

Lenses produced by the method and apparatus of the invention require no further finishing operations, other than an edge treatment to remove any flashing, and the application of one or more surface coatings, such as a hard surface coating, and or a tinting treatment.

Figure 6:
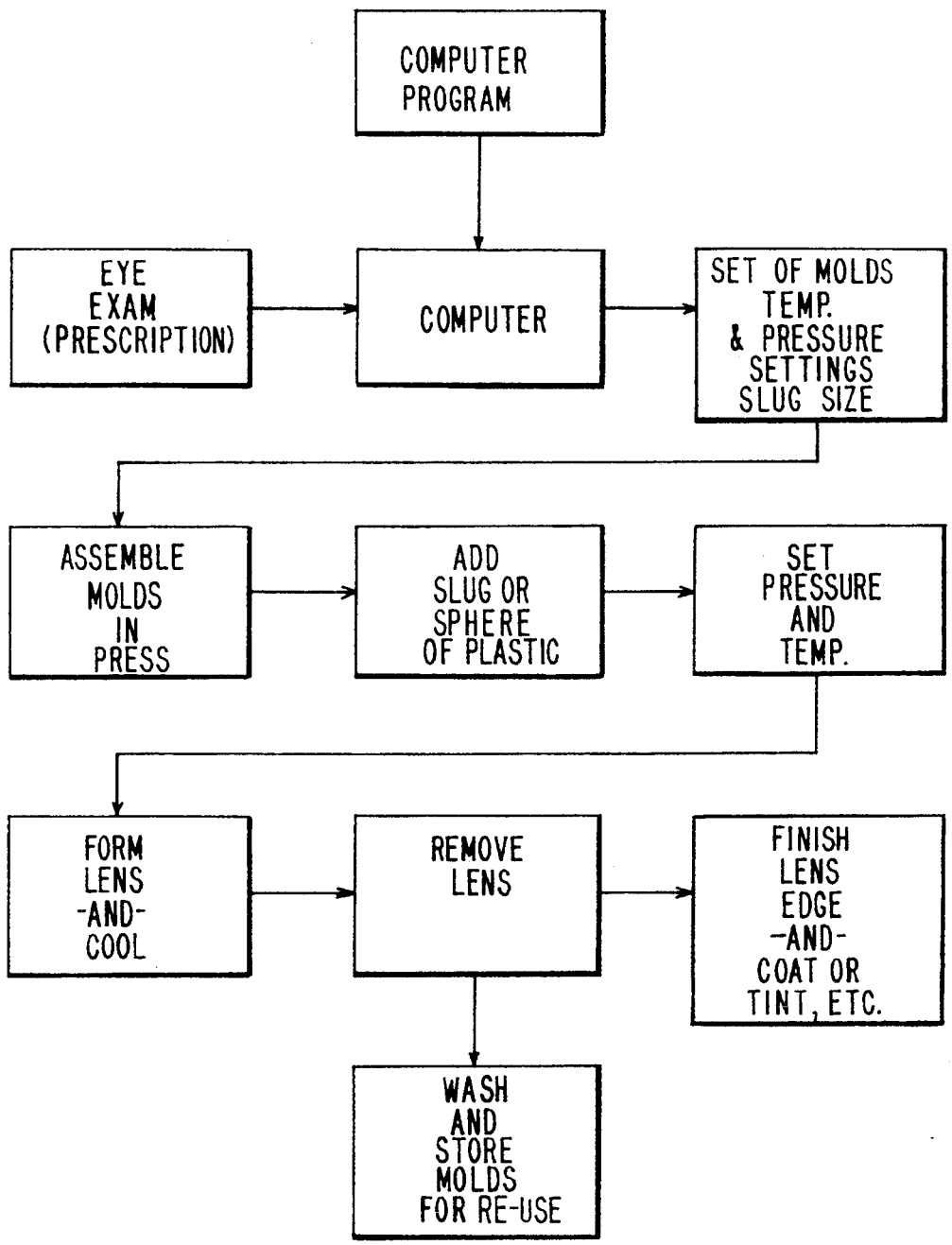
FIG. 6 is a work station with computer, keyboard, printer and display screen for providing a set of instructions to the operator for making a predetermined lens in accordance with a computer program designed to operate the lens making apparatus of the invention.
Figure 7:
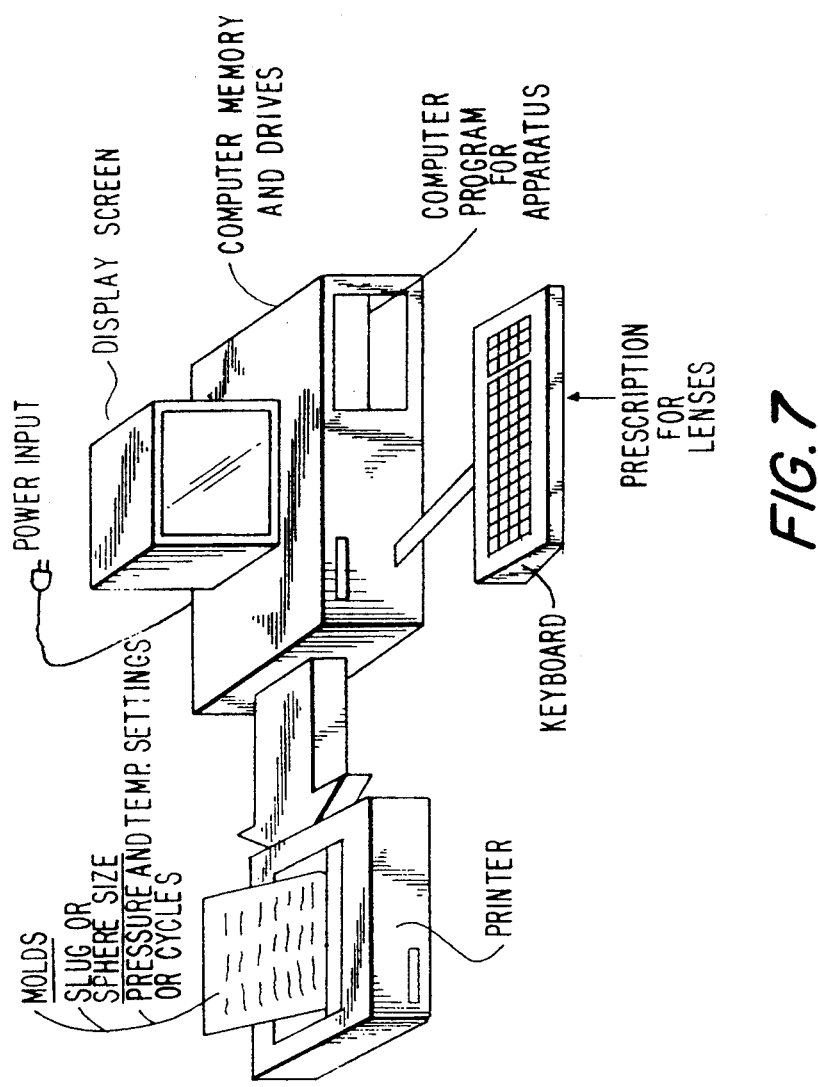
FIG. 7 is a flow diagram illustrating my method of making the lens.

In FIGS. 6 and 7, there is shown a typical computer work station for use with the apparatus of the invention. With the use of conventional or predetermined mold parts for making a prescription lens with a standardized program of referencing corrective lenses and their various machine settings, as well as decentration or prism-/wedge effect (movement of optical center from geometric center), on the apparatus of the invention, the user can select the desired slug/sphere or preform of given weight, and with the mold halves offset or located to achieve any desired decentration.

Thus, one can achieve the resulting ophthalmological lens output shown in the flow chart of FIG. 7 for just about any type of corrective lens, be it a bifocal, trifocal, or other type of corrective lens. The flow chart of FIG. 7 is self-explanatory and illustrates the various operative steps used in the method and apparatus of the invention.

The lenses are formed without any entrapped air bubbles due to the compression molding of the thermoplastic slug/sphere, and the lens fabricated can be immediately assembled (after an edge removal step) into a frame for the patient without the need to set up a return date so that the finished lens may be inserted in an eyeglass frame.

It is important with the method and apparatus of the invention to utilize a moldable thermoplastic material which can be heated and squeezed into the required shape. On average, a typical lens can be made by the method and apparatus of the invention in less than one-half to one hour.

It should be recognized that almost any type of lens can be fabricated by the method and apparatus of the invention, provided that prescription lens molds are in stock and form part of one's mold inventory. In this regard, the front and back molds form a set for any desired lens configuration or prescription as well as lens size, (i.e. 75 mm diameter). Generally, one would employ molds with diopter power increments of 0.25 (plus or minus) so that all prescriptions can be covered with the front and rear mold set configurations. The combinations of mold sets should cover substantially all standard or routine prescriptions, including multifocals, such as bifocal and trifocal, round, single vision, etc. (for example, bifocals have various base curves, with bifocal reading segments of different sizes and shapes, and many segment curves for the bifocal additions).

The molds may be made of highly tempered glass, or preferably, of metal. They contain curves of different radii ground and polished into their smooth optical surfaces. Both molds should be of the same material. In addition, the different curves or radii in a surface produce the corrective "power" to the finished lens formed by a mold set, (be it a bifocal or trifocal, etc.). The edges remain unfinished and must be trimmed or ground down to the lens diameter or size required to fit a frame. Also, the two molds are suitably spaced apart according to the edge thickness desired. There is no need for any type of gasketing means to stop any flow of material from slipping out from between the molds, as is required in casting of lens using well-known conventional processes.

The lenses made by the present invention are compression molded and suitable calibrating means which are well-known to those skilled in the art are used to form whatever decentration the lens is required to have along with the desired optical quality surfaces and powers prescribed. Once a lens is fabricated and removed from the apparatus of the invention, only the edge need be removed, and this can be done after tinting and/or a hardness coating is applied. With the method and apparatus of the invention, grinding and polishing of the optical surfaces is eliminated.

During the method of compression forming the lens, no air bubbles of any kind are formed in the lens. Any such lens would be defective if it included air bubbles. Heating is necessary to soften the pellet or slug (preform) and same is performed by the mold heating bands 19 and 21. The compression molding forms the lens without the formation of air bubbles in the lens.

Other suitable heating means may also be employed in the apparatus of the invention such as electrical coils or conduction heaters built into the molds as well as dielectrically pre-heating of the sphere and/or molds. Heating by convection and/or radiation does not work well, and would take considerably longer in time. Moreover, sensitivity in the controls would be more difficult to achieve.

The apparatus of the invention comprises a conventional type of computer program, embodying known software designed to specify by calculation and computation stock molds or sets of molds necessary to form a prescribed lens prescription which the user enters into the computer by keyboard or other input means. The output of the computer specifies in addition to the molds required, the temperature and pressure settings and/or cycles, preform size or weight of the pellet,-preform or sphere, and if desired, the compression molding and cool down time periods. Accordingly, as will be understood by those skilled in the art, one may also manually meet the prescription requirements of the molds, slug/sphere weight or size, settings of the apparatus, etc. by predetermined calculations and using suitable charts showing the values required. Such information and/or data could then be alternatively manually entered into the molding apparatus along with the particular molds required, in lieu of an automatic setting, including suitable means for retrieving the specified molds and positioning and suitably securing them directly on the mold support (for the bottom mold) and on the ram or piston (for the top mold). Such an automatic arrangement is shown for convenience in the block diagram of FIG. 6 which is illustrative of the various steps involved in the process or method of the invention. The "weight" of the preform is a function of lens size thickness and prescription, whereas the pressure and heat required to mold the lens is primarily a function of the lens material. For example, the weight of a Plano lens (no correction needed) 65 mm in diameter and 0.175" thick is 15 grams so preform weight would be slightly larger to insure full mold coverage and adequate flash about the entire lens periphery (the flash serving to grip the lens for further treatment, such as coatings, tinting, prior to its removal).

Figure 8:
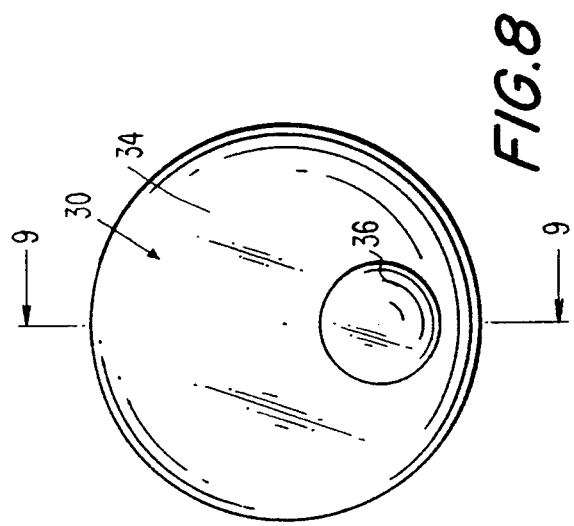
FIG. 8 is a typical lens (bifocal) made in accordance with the invention.
Figure 9:
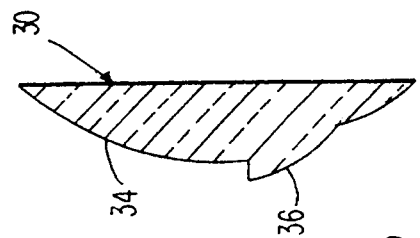
FIG. 9 is a cross-sectional view of the lens of FIG. 7, taken along the section line 8—8 of FIG. 7.

A typical lens capable of being fabricated by the method and apparatus of the invention is shown in FIGS. 8 and 9. As illustrated therein, the lens 30 is comprised of areas 34 and 36. Area 34 is the major surface for distance viewing and minor surface 36 of the bifocal lens is formed to the curvature desired for near viewing or the reading portion of the lens.

Typically, for generally any given lens prescription, manual computations using industry prescribed charts or desirably computer program calculations can be specified for identifying what stock molds are to be retrieved from storage, and used to fabricate the lens prescription in the apparatus of the invention. In addition, preform weight and/or size is identified and the material may be suitably specified as well or simply chosen by the patient and/or his or her doctor,etc. Also, mold cycle time including temperature and pressure settings are specified for the compression molding of a lens, as well as the cool down cycle time.

In operation, the molds are initially checked for scratches or any other imperfections or faults, as they must be clean and exhibit highly polished surfaces and set-up in the apparatus. A preform or sphere of the lens material is then placed or positioned mechanically on the bottom mold. The sphere or other preform used has radii which must make preferably either a point or other "centerline" contact with the mold halves so as to ensure a compression flow path which eliminates air bubbles or pockets of air trapped in the finished lens. Such shaped preform as will be explained hereinafter ensures that there can be no entrapped gases or air in the compression molded lens. Then, "cold" pressure is applied to the sphere or preform until a predetermined value is reached. For example, when making a lens using an acrylic material, a total pressure of about 1000 pounds is employed on the molds. Thereafter, the molds are heated from room temperature to a predetermined temperature. In the case of an acrylic material, the preform or sphere begins to soften at 240° F. and at a maximum temperature of about 280° F., the preform is totally compressed out into a lens.

Note that prior to the compression molding, decentration (prism or wedge effect) required would then be made by suitable conventional means (not shown) which would move the optical center of the lens from the geometric center. Such known means either moves one mold axis with respect to the other mold axis or cocks one mold on a desired slight angle (slant or wedge) to achieve the same decentration effect.

Figure 10:
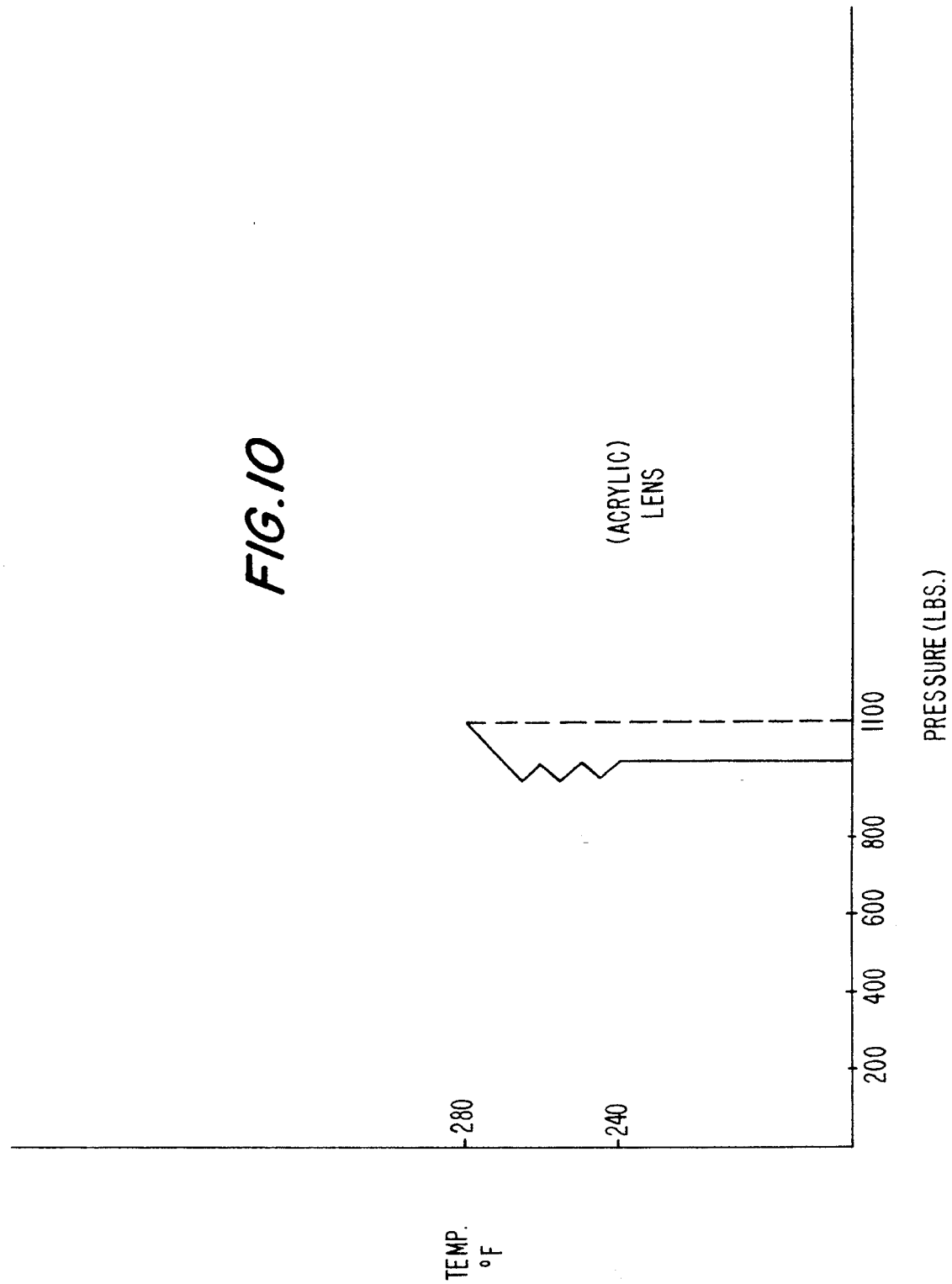
FIG. 10 is a graph of temperature versus pressure for a typical acrylic material used in a lens in accordance with the present invention.

As shown in FIG. 10, which represents a typical temperature-pressure graph of a lens material used in fabricating a lens employing the method and apparatus of the invention. As shown therein, once the cold pressure of 1000 total pounds is applied to the acrylic preform the molds are then heated up, and a pressure of 1000 total pounds is maintained until the sphere or preform begins to soften at which time the predetermined pressure value drops off due to softening of the thermoplastic lens material (sphere). The apparatus, however, is programmed to now maintain such predetermined pressure value and the temperature is increased further until the partially deformed sphere continues to deform again. This process is repeated on and off continually in a manner somewhat similar to an automatic temperature control in one's car or home, so that pressure is substantially constantly maintained, but temperature is increased all along until finally the preform or sphere is compression molded into a lens formed between the top and bottom molds, at which time heating is stopped and the molds are cooled. Once the lens is formed and the molds are "closed" (although they may not physically touch or "kiss" each other), the pressure observed on a gauge (not shown) of the apparatus dramatically rises (to about 1100 pounds in the case of the acrylic material) at which time only the heating means is closed down or turned off. The molds are then suitably cooled by a flow of water to the mold cavities or air may be suitably blown over the molds by fan means. The pressure is maintained at all times to preclude shrinkage, and once the molds and lenses are sufficiently cooled so the molds can be parted or opened to enable access and removal of the lens, the cooling water is shut down. The compression molded lens once removed is ready for any coatings, tinting, etc. and a final edge removal operation which may be conventionally done by grinding. The finished lens is thereafter checked for optical characteristics and then can be mounted in an eyeglass frame.

Figure 11A:
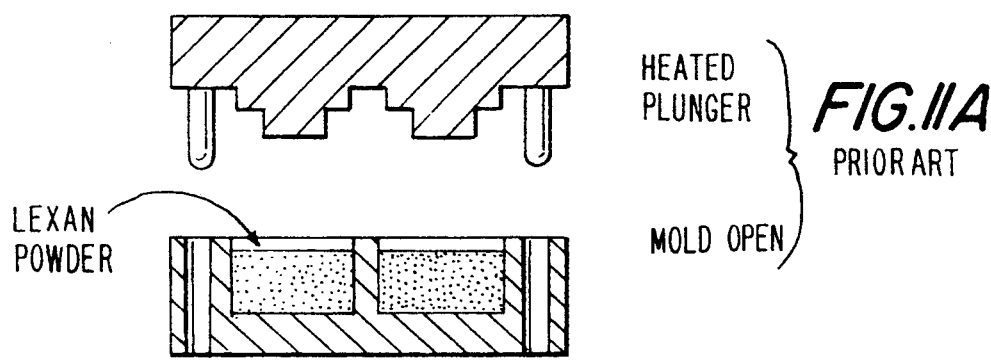
FIGS. 11A and 11B, and FIGS. 12A and 12B illustrate prior art compression molding systems.
Figure 11B:
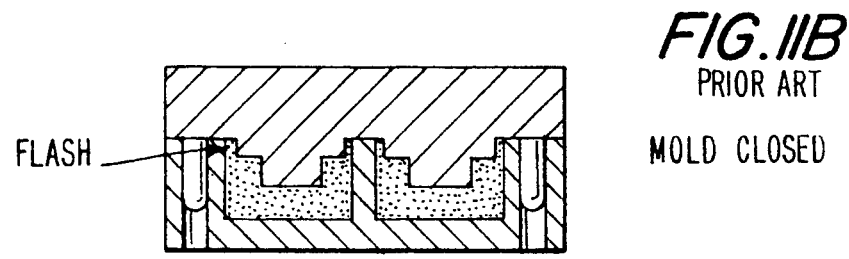

FIGS. 11A and 11B and 12A and 12B are examples of prior art compression molding systems. As shown in FIGS. 11A and 11B, a powder, such as LEXAN 145-111, which is polycarbonate resin made and sold by General Electric is loaded into a walled cavity of a preheated, open mold (480° F. to 520° F.). The LEXAN 145-111 may also be preheated until it begins to show surfaces melting (about 500° F). After loading the powder, the molding press with heated plunger closes the walled mold and forces the material to flow throughout the cavity. The mold is held closed under a low pressure for two to five minutes until complete fusion has occurred, and the pressure of approximately 1000 psi (total pressure is determined by the projected cross-sectional area of the molded part). Thereafter, the mold heating is turned off, and the mold is cooled to 275° F. or lower before opening the mold and extracting the part. With mold parts of a cross-section greater than ¼ inch, it is difficult to compression mold using a Lexan resin material as such parts usually require a long residence time in the mold at a high temperature with generally a resultant degradation of the polymer and darkening of the resin and a loss of properties. It should be noted that such powder form of resin, in order to ensure complete plasticization thereof, it is recommended to tamp and preheat, with tamping achieved on a press capable of high pressure, and preheating to the point where the tamped powder begins to soften and flow. Also, inasmuch as such powders have a high bulk factor of about 5.0 to 5.5, loading of the mold is critical and in order to ensure complete plasticization and adequate flashing, the loading may be accomplished by loading the powder in portions, alternately closing the mold as a tamp. If such powder is exposed to air, it must be predried at 250° F. for four to five hours before use. Even with such precautions, air bubbles can occur in the molded part. Such molded parts would of course be rejected and scrapped.

With the method and apparatus of the present invention, there is no air entrapped in the resin as a specific shaped monolithic preform is employed. Also, no walled mold is needed as the preform of the present invention is not liquified nor is the material plasticized. In fact, to do so would defeat the purpose of the invention and the material would shoot out from between the molds and/or cause air to start to become entrapped in the liquid mass. Bear in mind that melting and/or plasticizing of any resin material causes the melt which is under tremendous pressure to squirt and leak out of the molds. Such problems are ever present in such prior art system as it is very analogous to the conventional injection molding system of molding plastic parts.

Figure 12A:
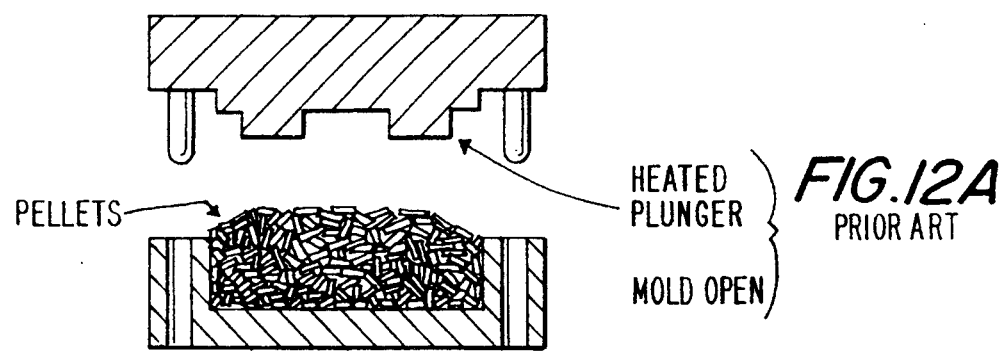
Figure 12B:
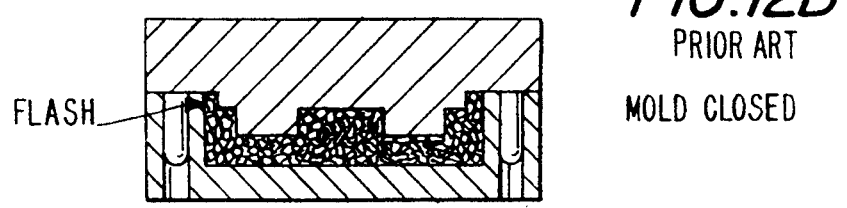

In FIGS. 12A and 12B, a similar prior art mold set up is shown which employs reground plastic materials formed into pellets which are easier to handle than resin powders. However, such system likewise cannot be used in the practice of the invention as pellets almost always guarantees numerous voids and/or air pockets in any molded part made therefrom. Such a condition cannot be tolerated in the fabrication of lenses, particularly those used in prescription eyeglasses. Thus, with the present method and apparatus of the invention, there is no need for walls of any kind, or for gaskets or other forms of rings to contain the liquid or plasticized material in the molds.

From the foregoing, it can be seen that a method and apparatus for making lens is provided whereby prescriptive and/or design requirements for most, if not all, ophthalmic and other plastic multifocal lenses encountered in the field may be produced simply and inexpensively with exceptional precision and efficiency by the optometrist and/or ophthalmologist. This is attributable to the present novel system for producing lens from stock molds, and which system avoids the need for a high degree of technical knowledge and skill in the operation of the method and apparatus of the invention. It should also be appreciated that the method and/or apparatus of the invention may be applicable to other types of lenses, such as those used in scientific equipment or in other optical devices.

Thus, so long as the material for such lenses are thermoplastic and capable of compression molding without degradation, it would appear practicable to use the method and apparatus using special molds to fabricate such lenses by the method and apparatus of the invention.

The shape of the monolithic preform is important for a number of reasons. First and foremost of all, the preform should be of a shape which totally eliminates any chance of air bubbles becoming entrapped in the lens during the compression molding of same. In addition, the larger the "spread out" area of the preform one initially starts with, the faster the preform is molded into a lens as movement of the mass of material is less and the heat transfer is fastest through the shorter distances of a "spread out" preform. Such a preferred preform shape for use with the invention is double convex form of blank. Another preferred blank form is a hemisphere; and additionally a sphere may be employed in the practice of the invention, but this blank form requires maximum movement of the mass of material forming the preform and takes considerably longer in transferring the heat throughout the spherical shape of the preform. In contrast thereto, lens blanks used today with conventional processes of grinding the lens surfaces essentially all have a concave-convex form. Such a form could not be employed in the practice of the present invention as the concave shape lends itself to entrapping air in pockets as the lens is formed between the molds. Moreover, most prior art lens blanks are made of thermosetting materials which cannot be compression molded. Accordingly, with the novel method and apparatus of the invention, the preform or "Universal" preform is made of a thermoplastic material, and it must always have smaller radii than that of any concave molds used to made a lens with the compression system of the invention.

Although the present invention has been described in some detail by way of illustration and example for purposes of clarity and understanding, it will, of course, be understood that various changes and modifications may be made with the form, details, and arrangements of the parts without departing from the scope of the invention as set forth in the following claims.

What is claimed is:

1. A method of making a lens from thermoplastic material comprising the steps of:
    a. placing a pair of lens molds in a press;
    b. positioning a monolithic preform mass having at least one or more radii between said molds such that the radii make point or line contact with each of said molds;
    c. pressing said pair of molds toward each other and against said preform mass to a predetermined pressure;
    d. heating up said pair of molds until said preform mass begins to soften and said predetermined pressure varies slightly therefrom;
    e. continuing to heat up said pair of molds while holding and maintaining said predetermined pressure on said preform mass;
    f. repeating steps d and e until said preform mass is reconfigured and/or transformed by compression molding into a lens defined by said pair of molds; and
    g. terminating the heating up of said pair of molds while maintaining said predetermined pressure until a formed lens is removed from said pair of molds.

2. The method according to claim 1, including the step of cooling said pair of molds while substantially maintaining said predetermined pressure.

3. A method of fabricating an ophthalmic quality lens, comprising the steps of compression molding a monolithic preform mass of thermoplastic material between a pair of molds having predetermined accurate and substantially matingly configured surfaces therebetween; said preform mass having one or more radii for making a point or line contact with each of said mold so as to preclude the entrapment of air pockets and the formation of air bubbles in a formed lens; maintaining a predetermined substantially constant pressure on said preform mass; and heating continuously said preform mass to increasingly higher temperatures while said predetermined substantially constant pressure is maintained until said preform mass is fully compression molded into said lens by said substantially matingly configured surfaces of said pair of molds.

4. The method in accordance with claim 3, wherein said arcuately configured and substantially mating surfaces have a convex-concave relationship.

5. The method in accordance with claim 3, wherein said preform mass of material has a predominately double convex configuration.

6. The method in accordance with claim 3, wherein said preform mass of material has a substantially hemispherical configuration.

7. The method in accordance with claim 3, wherein said preform mass of material has a substantially spherical configuration.

8. The method in accordance with claim 3, wherein said preform mass of thermoplastic material is selected from the group consisting of polycarbonates, polystyrenes, cellulose acetate, acrylic copolymers, thermoplastic polyesters, and mixtures thereof.

9. The method in accordance with claim 8, wherein said preform mass is an acrylic copolymer and said predetermined substantially constant pressure is approximately 1000 psi.

10. The method in accordance with claim 9, wherein the maximum temperature employed during the heating step is approximately 280 degree F.

11. The method in accordance with claim 3, including the step of cooling said pair of molds while maintaining said predetermined substantially constant pressure upon said preform mass of material.

* * * * *